United States Patent
Kumar et al.

(10) Patent No.: US 9,613,072 B2
(45) Date of Patent: Apr. 4, 2017

(54) CROSS PLATFORM DATA VALIDATION UTILITY

(71) Applicant: BANK OF AMERICA CORPORATION, Charlotte, NC (US)

(72) Inventors: Vishwamohan Kumar, Haryana (IN); Rajesh C. Thakur, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 332 days.

(21) Appl. No.: 14/527,061

(22) Filed: Oct. 29, 2014

(65) Prior Publication Data

US 2016/0124989 A1    May 5, 2016

(51) Int. Cl.
   *G06F 17/30*    (2006.01)

(52) U.S. Cl.
   CPC .. *G06F 17/30303* (2013.01); *G06F 17/30569* (2013.01)

(58) Field of Classification Search
   CPC .................................................. G06F 17/30179
   See application file for complete search history.

(56) References Cited

U.S. PATENT DOCUMENTS

| | | | | |
|---|---|---|---|---|
| 6,078,924 A * | 6/2000 | Ainsbury | ........... | G06F 17/30011 |
| 6,523,041 B1 * | 2/2003 | Morgan | ................ | G06Q 30/02 |
| 6,792,431 B2 * | 9/2004 | Tamboli | ............ | G06F 17/30569 |
| 8,250,026 B2 * | 8/2012 | Mok | ..................... | G06F 19/322 |
| | | | | 707/602 |
| 8,468,119 B2 * | 6/2013 | Kumar | .............. | G06F 17/30566 |
| | | | | 707/602 |
| 8,606,666 B1 * | 12/2013 | Courbage | .............. | G06Q 40/04 |
| | | | | 235/381 |
| 8,819,042 B2 * | 8/2014 | Samudrala | ........ | G06F 17/30557 |
| | | | | 707/758 |
| 8,977,636 B2 * | 3/2015 | Bodin | ................. | G06F 17/3089 |
| | | | | 707/756 |
| 9,147,042 B1 * | 9/2015 | Haller | ................... | G06F 19/328 |
| 9,152,727 B1 * | 10/2015 | Balducci | ........... | G06F 17/30876 |
| 9,342,783 B1 * | 5/2016 | Chang | ................ | H04L 12/5875 |
| 2003/0212654 A1 * | 11/2003 | Harper | .................. | G06Q 30/02 |
| 2007/0156652 A1 * | 7/2007 | Horstmanshof | .... | G06F 17/3056 |
| 2007/0168382 A1 * | 7/2007 | Tillberg | ............ | G06F 17/30253 |
| 2008/0235176 A1 * | 9/2008 | Kirovski | ................ | G06F 21/64 |
| 2009/0006253 A1 * | 1/2009 | Bresnan | ................ | G06Q 30/06 |
| | | | | 705/40 |

(Continued)

*Primary Examiner* — Richard Bowen
(74) *Attorney, Agent, or Firm* — Michael A. Springs; Moore & Van Allen PLLC; Anup Shrinivasan

(57) ABSTRACT

The present invention is directed to a system that enables an associate (a data specialist, an agent, an analyst, or the like) to efficiently and accurately validate customer data (e.g., determine if customer data between two or more sets of customer data is consistently accurate). In this way, the system of the present invention is configured to enable the associate to run automated tests (e.g., trials) where first customer data from a first customer data set is compared to second customer data from a second customer data set to determine one or more differences between the first and second customer data. After the comparison is complete, the system of the present invention is configured to generate a file (e.g., a third customer data set) that identifies the determined differences, and provides a standardized report summarizing the determined differences.

18 Claims, 4 Drawing Sheets

(56) References Cited

U.S. PATENT DOCUMENTS

2009/0292740 A1* 11/2009 Bose ................ G06F 17/30569
2011/0010401 A1*  1/2011 Adams ............. G06F 17/30315
                                                              707/805
2011/0072027 A1*  3/2011 Wu .................... G06F 17/2211
                                                              707/758
2012/0215799 A1*  8/2012 Bohner .............. G06F 19/322
                                                              707/755

* cited by examiner

CROSS PLATFORM DATA VALIDATION UTILITY

BACKGROUND

When implementing a new application in an existing software system, data to be used by the new application that is currently used by other applications in the existing system is often consolidated from multiple different sources. However, accuracy and format of this data between each source may be inconsistent. Therefore, a need exists for a cross-platform data validation utility that enables an associate to efficiently and accurately validate data from a plurality sources so that the data may be used by the new application and the existing system as a whole.

BRIEF SUMMARY

The present invention is directed to a system that enables an associate (a data specialist, an agent, an analyst, or the like) to efficiently and accurately validate customer data (e.g., determine if customer data between two or more sets of customer data is consistently accurate). In this way, the system of the present invention is configured to enable the associate to run automated tests (e.g., trials) where first customer data from a first customer data set is compared to second customer data from a second customer data set. Before the comparison, the system of the present invention converts the format of each of the first and second customer data into a standardized format for efficient processing. During the comparison, the system of the present invention determines one or more differences between the first and second customer data. After the comparison is complete, the system of the present invention is configured to generate a file (e.g., a third customer data set) that identifies the determined differences, and provides a standardized report summarizing the determined differences. The associate may then review the generated file and/or report, which aids the associate in correcting the determined differences between customer data sets.

In some embodiments, a system for determining differences between two sets of customer data is provided. The system comprises: at least one memory; at least one processor; and at least one module stored in memory, executable by the at least one processor. The module is configured to: receive a first set of customer data from a first database; convert the first set of customer data from a first format into a final format; store the formatted first set of customer data in a first file; receive a second set of customer data from a second database; convert the second set of customer data from a second format into the final format; store the formatted second set of customer data in a second file; retrieve the first file and the second file; compare the formatted first set of customer data in the first file and the formatted second set of customer data in the second file to determine one or more differences between the first set of customer data and the second set of customer data; and generate a third file comprising the one or more determined differences between the first set of customer data in the first file and the second set of customer data in the second file.

In some embodiments, the final format of each of the first and second sets of customer data comprises a single column comprising one or more rows of customer data.

In some embodiments, the final format of each of the first and second sets of customer data comprises at least one of a text file or a spreadsheet.

In some embodiments, comparing the formatted first set of customer data in the first file and the formatted second set of customer data in the second file comprises a row-by-row comparison of the formatted first set of customer data in the first file and the formatted second set of customer data in the second file.

In some embodiments, the module is further configured to generate a report identifying at least one of the one or more determined differences between the first set of customer data in the first file and the second set of customer data in the second file.

In some embodiments, the report comprises at least one of a test identification (ID), a table name, a file name, a column list, a table count, a total number of determined differences between the first set of customer data in the first file and the second set of customer data in the second file, a summary of ten determined differences between the first set of customer data in the first file and the second set of customer data in the second file, or a hyperlink reference to the third file.

In some embodiments, the module is further configured to: receive from a user a request for comparing the first and second sets of customer data; generate a request script of a computer-executable instructions for comparing the formatted first and second sets of customer data based on the request; and execute the request script to initiate receipt of the first set of customer data from the first database.

In some embodiments, receiving the request from the user comprises receiving from a user one or more parameters for comparing the first and second sets of customer data, wherein the one or more parameters comprise at least one of ranges of customer data in the first and second sets of customer data to be included in the comparison, a maximum number of customer data entries to be compared in each of the first and second sets of customer data, a first table name and file, a second table name and file, one or more storage locations, or a destination email address.

In some embodiments, the request is placed in a queue for execution by the module of the request script.

In some embodiments, the first database and the second database are in different geographic locations.

In some embodiments, a method for determining differences between two sets of customer data. The method comprises: receiving, by a computing device processor, a first set of customer data from a first database; converting, by a computing device processor, the first set of customer data from a first format into a final format; storing, by a computing device processor, the formatted first set of customer data in a first file; receiving, by a computing device processor, a second set of customer data from a second database; converting, by a computing device processor, the second set of customer data from a second format into the final format; storing, by a computing device processor, the formatted second set of customer data in a second file; retrieving, by a computing device processor, the first file and the second file; comparing, by a computing device processor, the formatted first set of customer data in the first file and the formatted second set of customer data in the second file to determine one or more differences between the first set of customer data and the second set of customer data; and generating, by a computing device processor, a third file comprising the one or more determined differences between the first set of customer data in the first file and the second set of customer data in the second file.

In some embodiments, a computer program product for determining differences between two sets of customer data is provided. The computer program product comprises a non-transitory computer-readable medium comprising code causing an apparatus to: receive a first set of customer data from a first database; convert the first set of customer data from a first format into a final format; store the formatted first set of customer data in a first file; receive a second set of customer data from a second database; convert the second set of customer data from a second format into the final format; store the formatted second set of customer data in a second file; retrieve the first file and the second file; compare the formatted first set of customer data in the first file and the formatted second set of customer data in the second file to determine one or more differences between the first set of customer data and the second set of customer data; and generate a third file comprising the one or more determined differences between the first set of customer data in the first file and the second set of customer data in the second file.

In some embodiments, a method for resolving error cases related to transactions using a research tool that provides steps for resolving the error cases is provided. The method comprises presenting, by a computing device processor, a research interface to a user to resolve an error case related to a transaction for which an error occurred during processing of the transaction. The method further comprises receiving, by a computing device processor, error case information associated with the error case, wherein the error case information may be inputted manually or populated automatically with information captured during processing of the transaction. The method further comprises determining, by a computing device processor, a scenario number based on the received error case information based on the received error case information for the error case. The method further comprises initiating, by a computing device processor, presentation of a research scenario comprising one or more resolution information fields configured to receive resolution information of the error case based on the determination of the scenario number. The method further comprises receiving, by a computing device processor, resolution information of the error case from the user, wherein the resolution information is inputted into the one or more resolution information fields. The method further comprises generating, by a computing device processor, a standardized set of procedures for resolving the error case based on the received error case information and resolution information of the error case.

In some embodiments, a computer program product for resolving error cases related to transactions using a research tool that provides steps for resolving the error cases is provided. The computer program product comprises a non-transitory computer-readable medium comprising code causing an apparatus to present a research interface to a user to resolve an error case related to a transaction for which an error occurred during processing of the transaction. The code further causes the apparatus to present a research interface to a user to resolve an error case related to a transaction for which an error occurred during processing of the transaction. The code further causes the apparatus to receive error case information associated with the error case, wherein the error case information may be inputted manually or populated automatically with information captured during processing of the transaction. The code further causes the apparatus to determine a scenario number based on the received error case information based on the received error case information for the error case. The code further causes the apparatus to initiate presentation of a research scenario comprising one or more resolution information fields configured to receive resolution information of the error case based on the determination of the scenario number. The code further causes the apparatus to receive resolution information of the error case from the user, wherein the resolution information is inputted into the one or more resolution information fields. The code further causes the apparatus to generate a standardized set of procedures for resolving the error case based on the received error case information and resolution information of the error case.

The system of the present invention provides many benefits. First, the system of the present invention reduces the amount of time it takes to process (e.g., compare and validate) large volumes of customer data. Second, by automating the customer data validation process, accuracy of customer data is drastically increased. Thirdly, converting customer data from multiple different sources (e.g., platforms, applications, other systems, or the like) into a standardized format, the system of the invention prepares validated customer data for consistent use across multiple platforms. Lastly, generating a file and report identifying and summarizing determined differences between two sets of customer data greatly reduces the amount of time required from an associate to correct any inconsistencies or inaccuracies in customer data. Clearly, the system of the present invention saves associates a considerable amount of time when validating customer data.

BRIEF DESCRIPTION OF THE DRAWINGS

Figure 1:
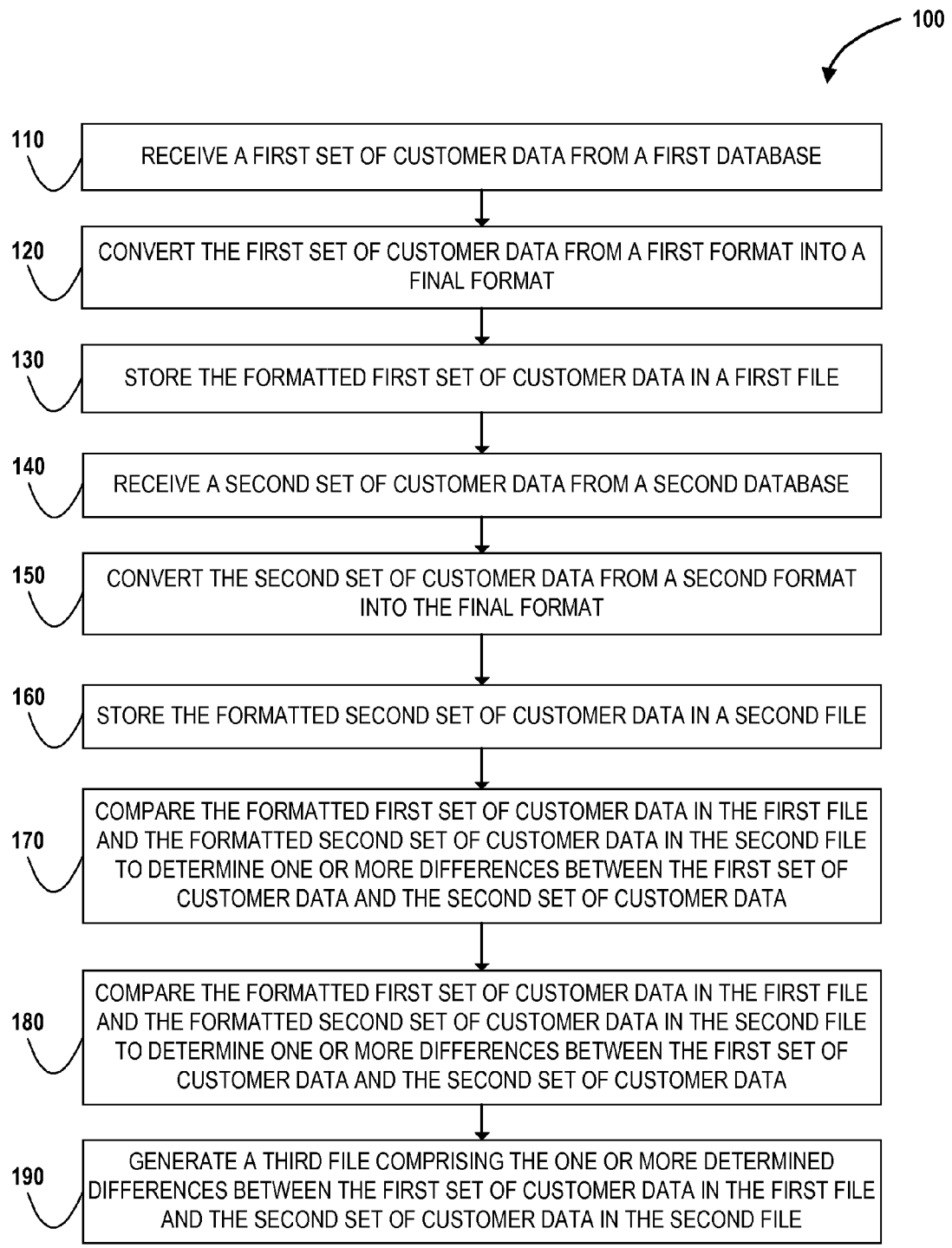
Figure 2:
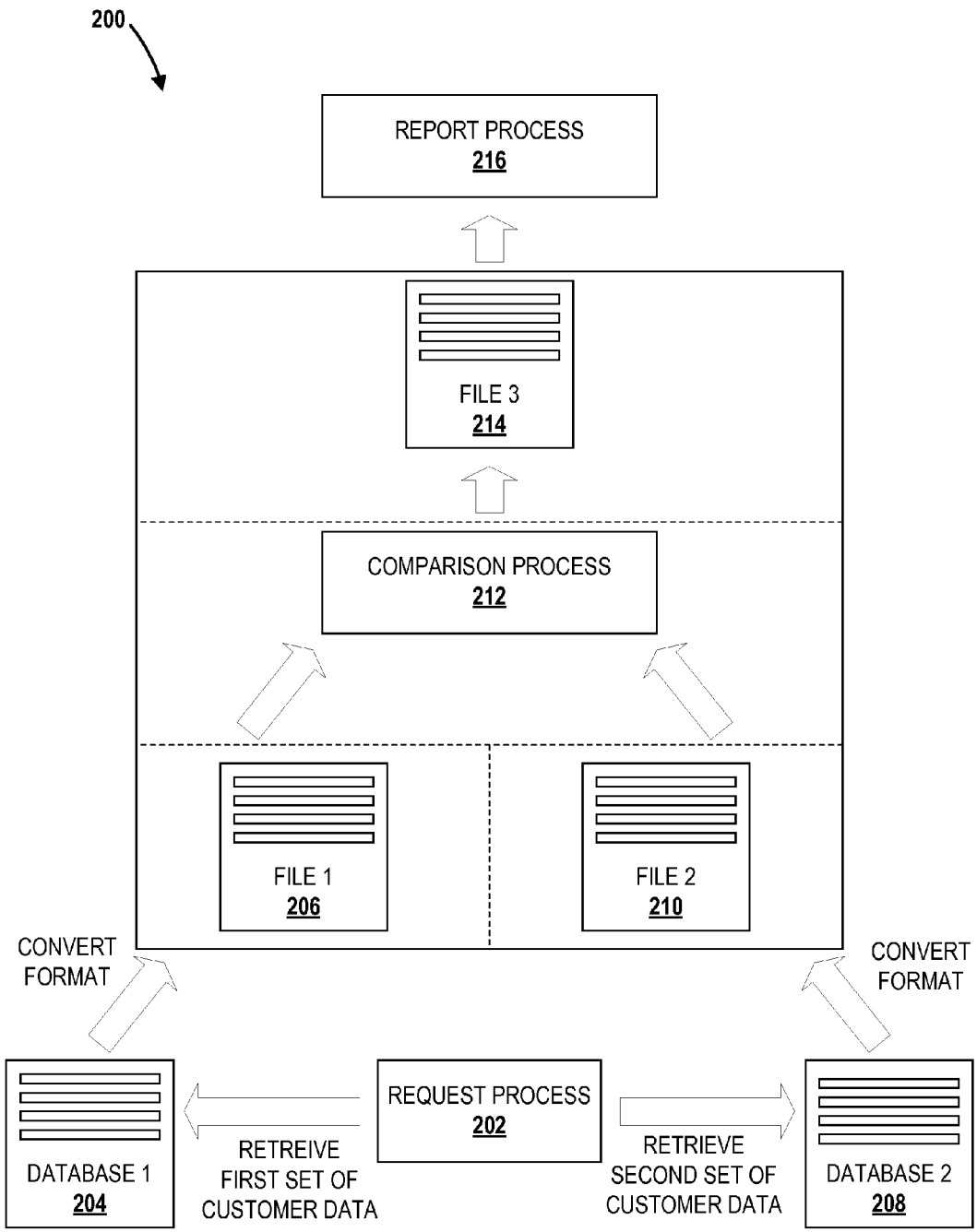
Figure 3:
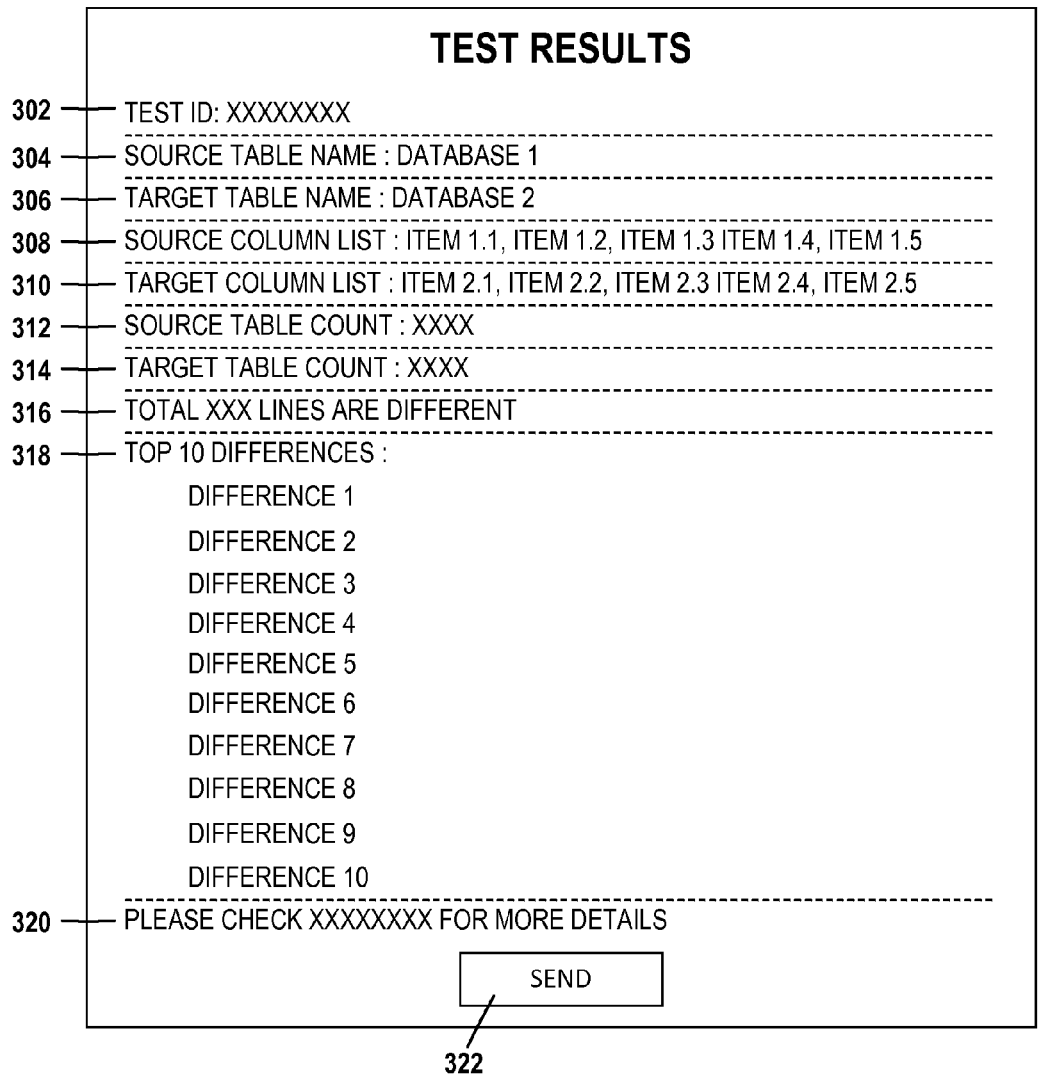
Figure 4:
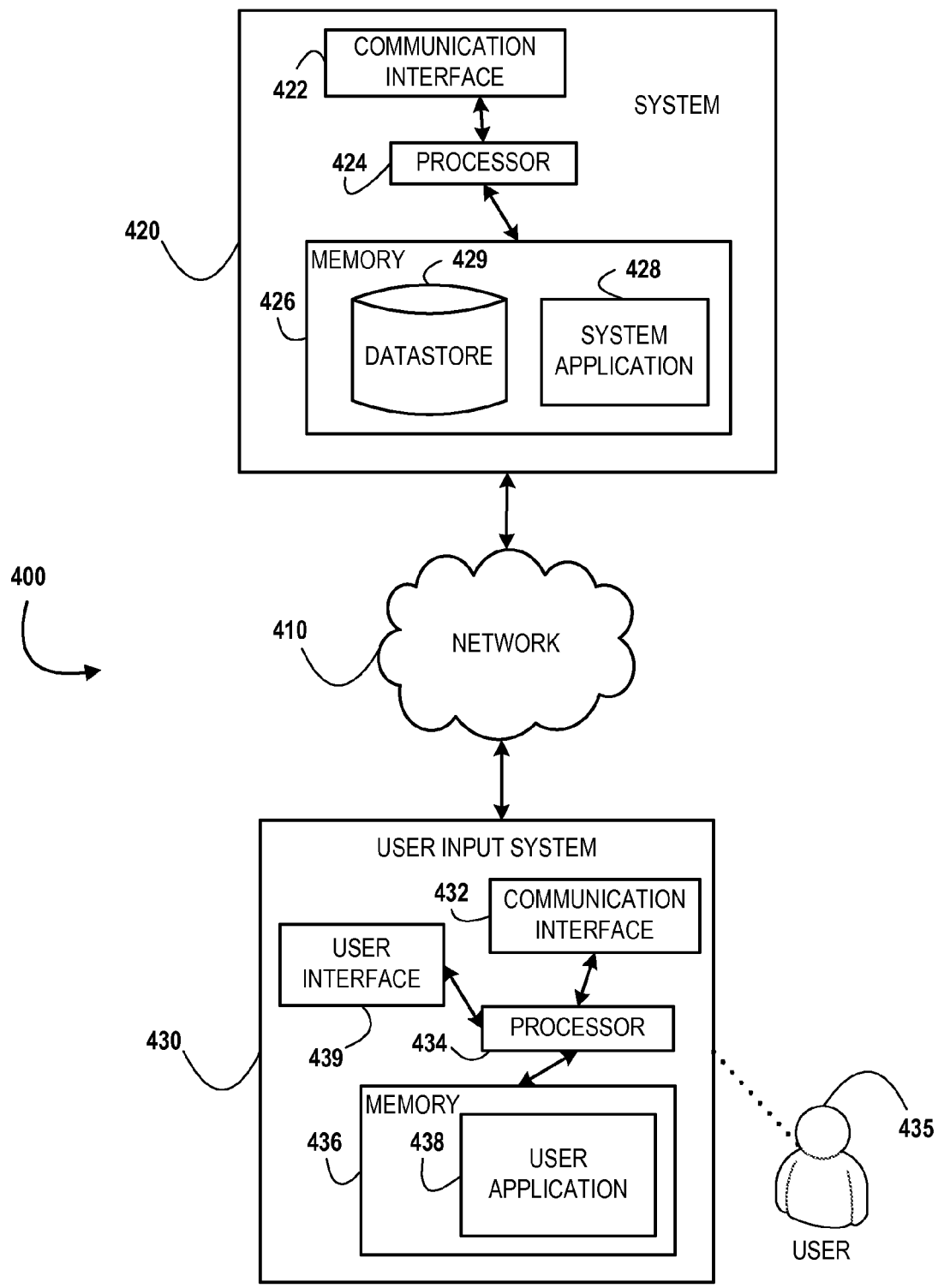

Having thus described embodiments of the invention in general terms, reference will now be made to the accompanying drawings, where:

FIG. 1 is an exemplary process flow illustrating a process for validating customer data, in accordance with embodiments of the present invention;

FIG. 2 is an exemplary process flow for comparing two sets of customer data to determine differences between the two sets of customer data, in accordance with embodiments of the present invention;

FIG. 3 is an exemplary user interface for a generated report summarizing determined differences between first and second customer data sets; and FIG. 4 is an exemplary system environment for resolving error cases related to transactions using a research tool that provides steps for resolving the error cases, in accordance with embodiments of the present invention.

DETAILED DESCRIPTION OF THE PRESENT INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As used herein, the term "user" refers to anyone who interacts with the present invention. Typically, the user is an employee of an entity such as an associate, a data specialist, an agent, an analyst, or the like who is responsible for validating customer data from a plurality of different sources.

When a new application is to be implemented by the entity for the purpose of processing and distributing customer data amongst a plurality of software applications for efficient use, there is a need to consolidate existing customer data associated with a plurality of existing applications for utilization by the new application. However, existing customer data may be stored in a plurality of different storage locations in different geographic regions. Existing customer data may also contain inconsistencies and/or discrepancies of information, duplicates of information, or possess other potentially problematic characteristics. Furthermore, because existing customer data may be retrieved for consolidation from a plurality of sources and/or applications, existing customer data may be formatted differently. Current processes for customer data consolidation and validation include manual validation, which is very time consuming, inefficient, expensive, error-prone, and inaccurate, particularly in regards to migrating large volumes of customer data. Clearly, there is a need to determine differences between customer data retrieved from different sources to ensure accuracy and consistency of consolidated customer data, as well as a need for converting existing customer data into a common, standardized format for efficient use and/or processing by the new application.

The present invention is directed to a system that enables an associate (a data specialist, an agent, an analyst, or the like) to efficiently and accurately validate customer data (e.g., determine if customer data between two or more sets of customer data is consistently accurate). In this way, the system of the present invention is configured to enable the associate to run automated tests (e.g., trials) where first customer data from a first customer data set is compared to second customer data from a second customer data set. Before the comparison, the system of the present invention converts the format of each of the first and second customer data into a standardized format for efficient processing. During the comparison, the system of the present invention determines one or more differences between the first and second customer data. After the comparison is complete, the system of the present invention is configured to generate a file (e.g., a third customer data set) that identifies the determined differences, and provides a standardized report summarizing the determined differences. The associate may then review the generated file and/or report, which aids the associate in correcting the determined differences between customer data sets.

The system of the present invention provides many benefits. First, the system of the present invention reduces the amount of time it takes to process (e.g., compare and validate) large volumes of customer data. Second, by automating the customer data validation process, accuracy of customer data is drastically increased. Thirdly, converting customer data from multiple different sources (e.g., platforms, applications, other systems, or the like) into a standardized format, the system of the invention prepares validated customer data for consistent use across multiple platforms. Lastly, generating a file and report identifying and summarizing determined differences between two sets of customer data greatly reduces the amount of time required from an associate to correct any inconsistencies or inaccuracies in customer data. Clearly, the system of the present invention saves associates a considerable amount of time when validating customer data.

Customer data may include at least one of customer information (e.g., a customer name, a customer number, a customer address, a customer phone number, a customer email address, a customer username or password, user preferences, or the like), account information (e.g., an account number, a routing number, an account balance, an account type, or the like), transaction information (e.g., a transaction amount, a transaction type, a payee, a merchant name, a transaction date, a payment type, a transaction history, or the like), or other information related to a customer or an account held by the customer. Customer data may be automatically added, deleted, received, transmitted, retrieved, stored, and/or modified by the system of the present invention, or upon manual input received by the user.

Referring now to the Figures, FIG. 1 is an exemplary process flow 100 illustrating a process for validating customer data. At block 110, the process includes receiving a first set of customer data from a first database. At block 120, the process includes converting the first set of customer data from a first format into a final format. At block 130, the process includes storing the formatted first set of customer data in a first file. At block 140, the process includes receiving a second set of customer data from a second database. At block 150, the process includes converting the second set of customer data from a second format into the final format. At block 160, the process includes storing the formatted second set of customer data in a second file. At block 170, the process includes retrieving the first file and the second file. At block 180, the process includes comparing the formatted first set of customer data in the first file and the formatted second set of customer data in the second file to determine one or more differences between the first set of customer data and the second set of customer data. At block 190, the process includes generating a third file comprising the one or more determined differences between the first set of customer data in the first file and the second set of customer data in the second file.

Referring now to FIG. 2, FIG. 2 illustrates an exemplary process flow 200 for comparing two sets of customer data to determine differences between the two sets of customer data. The user may be required to initiate comparison between a first set of customer data and a second set of customer data by generating a request according to a request process 202. In other embodiments, the system of the present invention may be configured to automatically initiate a comparison between two or more sets of customer data.

The request process 202 typically includes initiating presentation of a user interface to a user that enables a user to input one or more pieces of information (e.g., comparison inputs, comparison information, task data, or the like). The one or more pieces of information may include one or more name of files (e.g., sets of customer data to be compared, a result set of determined differences after a comparison is executed, or the like), one or more file locations (e.g., storage locations of first and second sets of customer data, a destination storage location of formatted first and second sets of customer data, a destination storage location of a result set of determined differences after a comparison is executed, or the like), a list of pieces of customer data in each set of customer data to be compared, a utility selection (e.g., a selection of one or more applications that are responsible for conducting the comparison, transmittal of customer data, or the like), an email address (e.g., a destination email address to which a generated result set and accompanying report may be transmitted), one or more limits on numbers of pieces of customer data to be compared (e.g., only the first 50 rows of each of the first and second customer data sets are to be compared, only even rows are to be compared, or the like), a comparison duration, a comparison start time, a comparison frequency (e.g., how often a comparison between two or more particular customer data sets are to be compared, a denotation that a comparison is to be recurring at periodic intervals such as one comparison every two months, or the like), a login identification (ID) of the user, a test or comparison number or ID, or the like.

The user then provides one or more inputs, selections, or pieces of information to configure the comparison. In this way, the user may choose which sets (two or more sets) of customer data to be compared to one another for the purpose of identifying differences between chosen sets of customer data. In some embodiments, the user may input pieces of information into a spreadsheet or similar application. The inputs are received by the system of the present invention, and may be stored in one or more storage locations.

In response to receiving one or more inputs from the user, and based at least partially on the received inputs, the request process 202 of the system of the present invention may further include generating a comparison script for executing the desired comparison. The system of the present invention essentially translates the user-provided inputs into the comparison script (e.g., machine-readable and/or computer-executable code) so that the comparison may be executed by the system of the present invention. The system of the present invention may further enable the user to add, delete, and/or modify customer data or the generated comparison script at any time. Generation of the comparison script enables the system of the present invention to execute the comparison. Allowing the system of the present invention to execute the comparison eliminates the need for manual customer data validation (e.g., comparison) and provides maximum accuracy. The generated comparison script further may utilize one or more password encryption processes (in the event that user authentication or data encryption processes are implemented within the system of the present invention or one or more systems in communication with the system of the present invention), and is configured to work in different modes (e.g., facilitating configuration and/or execution of autonomous, recurring comparisons, facilitating configuration and/or execution of user-controlled comparisons, facilitating configuration and/or execution of two or more independent comparisons for a particularly large volume of customer data to be validated, or the like). For example, the system of the present invention may be configured to determine that when a number of entries of customer data is to be compared, the comparison is to be executed as two independent, smaller comparisons.

After the system of the present invention generates the comparison script, the system of the present invention may, during the request process 202, place the generated comparison script in a queue for execution of the desired comparison. The system may then execute the desired comparison when the (e.g., all comparison scripts that have been placed in the queue prior to placing the present comparison script in the queue have been executed). Alternatively, the desired comparison may be executed at a predetermined time as denoted in the comparison inputs (e.g., the one or more pieces of information) and may be scheduled and/or repeated without any manual intervention.

The system of the invention then executes the comparison script. Execution of the comparison script initiates retrieval of a first set of customer data from a first database 204. Alternatively, execution of the comparison script initiates retrieval of a second set of customer data from a second database 208. Furthermore, the first database 204 and the second database 208 are used herein merely as examples—the system of the present invention is configured to support two or more sets of customer data, which is retrieved from two or more databases, for comparison.

In some embodiments, the system of the present invention may retrieve the first set of customer data from the first database 204 before retrieving the second set of customer data from the second database 208. In other embodiments, the system of the present invention may retrieve the first set of customer data from the first database 204 after retrieving the second set of customer data from the second database 208. In alternative embodiments, the system of the present invention may retrieve the first set of customer data from the first database 204 substantially simultaneously to retrieving the second set of customer data from the second database 208.

Typically, the first database 204 is associated with a first customer data processing application, while the second database 208 is associated with a second customer data processing application. Each of the first database 204 and the second database 208 may be respectively located in different geographic locations, located in different storage locations, and/or may be associated with different systems or applications. However, the first database 204 and the second database 208 may also be located in the same geographic location, in the same memory location, or the like.

Each of the first and second sets of customer data comprise customer data that may be formatted for use and/or processing by a particular customer data processing application or system. Because each customer data processing application or system may process customer data of a different format, each of the first and second sets of customer data may have a different or substantially unique format. Therefore, the system of the present invention is configured to convert the format of each of the first and second (or additional) sets of customer data from its original format into a standardized final format. In this way, the system of the present invention ensures that, upon processing, all consolidated customer data is formatted uniformly for use across a plurality of systems, platform, or applications. Therefore, in regards to the system of the present invention, there is little to no concerning from which database, system, and/or customer processing application the customer data was retrieved. Examples of the final format of each customer data set include a workbook, spreadsheet, or a text file, where each piece of customer data of each customer data set is an entry (e.g., a row) in a singular column. Other final formats may be used as well. The system of the present invention may format in real time or near-real time, or may format as a separate step of the comparison process 212.

Upon conversion of the format of the customer data retrieved from the first database 204 and/or the second database 208, the system of the present invention is configured to store the formatted customer data. Typically, the first set of formatted customer data (e.g., the customer data retrieved from the first database 204) is stored as a first file 206, while the second set of formatted customer data (e.g., the customer data retrieved from the second database 208) is stored in as second file 210. Storing the formatted customer data sets provides the system of the present invention with an opportunity to consolidate customer data from a plurality of sources so that the system of the present invention may serve as a central repository of customer data (and therefore customer data validation). Not only does storing the formatted customer data in files 206, 208 prior to comparing the files 206, 208 enable the system of the present invention to recall customer data from a plurality of sources more efficiently, it also provides better control for customer data validation processes. In some embodiments, the first file 206 and second file 210 may be stored on the same or a similar storage device associated with the system of the present invention. In other embodiments, the first file 206 may be stored in a different storage location or on a different storage device as the second file 208. In some embodiments, the system of the present invention may retrieve, convert the format of, and/or store customer data of the first set of customer data before, after, or simultaneously to retrieving, converting the format of, and/or storing customer data of the second set of customer data.

The system of the present invention continues with a comparison process 212. During the comparison process 212, the system of the present invention retrieves each customer data set stored in each file 206, 210. The system of the present invention then compares each entry (e.g., row) of customer data in the first data set to each respective entry (e.g., corresponding row) of customer data in the second set. In this row-by-row fashion, the system of the present invention compares the formatted entries of customer data of each customer data set to one other to determine if the entries of customer data match. For example, the system of the present invention is configured to determine if an Entry 1 of the first customer data set matches an Entry 1 of the second customer data set, if an Entry 2 of the first customer data set matches an Entry 2 of the second customer data set, and so on. This comparison may continue until all entries of the customer data set with the lowest number of entries have been compared, until one or more of the comparison limits established by the user have been met, until a predetermined period of time has elapsed, or the like. The actual comparison executed by the system of the present invention may include comparing strings of characters (e.g., a customer name or address) held in each corresponding entry of two compared customer data sets, or the like.

Through comparing entries of customer data sets during the comparison process 212, the system of the present invention may determine one or more differences between compared customer data entries. For example, the system of the present invention is configured to determine that there exists a spelling discrepancy of a customer name or address. In this way, the system of the present invention provides validation for consolidated customer data, which ultimately ensures drastically increased accuracy of customer data across a plurality of software platforms, systems, and/or applications. The system of the present invention may, upon determination of a difference between compared customer data entries of the first and second customer data sets, flag or denote the determined differences. Further, by automating this comparison process 212 (including determining differences between customer data entries), the data validation process as whole is much more efficient, especially when compared to current methods of manual customer data validation.

The system of the present invention is further configured to generate a third file 214 that includes a result set of customer data (e.g., all determined differences). Therefore, the user may view the third file 214 to review the result set, and the user may be enabled to add, delete, and/or modify data in the third file 214. The third file 214 may also serve as a reference for aiding the user (or another user) in correcting the determined differences, thus ensuring greater accuracy of the consolidated customer data. The third file 214 may be stored in the same memory device or memory location as the first file 206 and the second file 210, or in a different memory location associated with the same or different device or system.

After the comparison process 212 is over and the differences between the first and second customer data sets have been determined and stored in the third file 214, the system of the present invention may execute a report process 216. For example, the system of the present invention may generate a report summarizing the comparison process, the inputted comparison information, and/or the determined differences between customer data sets. The report may be formatted as a message, an email, a spreadsheet, a website, a link, a document, or another type of report.

FIG. 3 depicts an exemplary report 300 generated by the system of the present invention during the report process 216 in response to execution of the comparison process 212 and generation of the third file 214. The report 300 may include a test ID 302, a source table name 304 (e.g., the second set of customer data), a target table name 306 (e.g., the second set of customer data), a source column list 308 (e.g., each customer data entry of the first set of customer data), a target column list 310 (e.g., each customer data entry of the second set of customer data), a source table count 312 (e.g., a number of customer data entries included in the first set of customer data), a target table count 314 (e.g., a number of customer data entries included in the second set of customer data), a total number of determined differences between customer data entries of the first and second sets of customer data 316, a summary of the "Top 10" determined differences 318, a reference link to the result set (e.g., the third file 214) 320, or other information associated with the executed comparison. The report 300 may be transmitted as an email or other type of message by selecting a "Send" button 222.

In this way, the user may simply be required to input comparison information (e.g., parameters of the comparison) to then receive at a later time a generated report with reference to the result set (e.g., third file 214) for review. This enables the user to validate large volumes of customer data with minimized manual effort. Clearly, the system of the present invention provides means for validating customer data more efficiently and securely, and results in consolidated, accurate customer data.

FIG. 4 is an exemplary block diagram illustrating technical components of a system 400 for implementing the system of the present invention for researching and resolving an error case as described in process flow 100 of FIG. 1 and process flow 200 of FIG. 2, as well as the exemplary interface 300 as illustrated in FIG. 3. As illustrated, the system environment 400 includes a network 410, a system 420, and a user input system 430.

As shown in FIG. 4, the system 420, and the user input system 430 are each operatively and selectively connected to the network 410, which may include one or more separate networks. In addition, the network 410 may include a telecommunication network, local area network (LAN), a wide area network (WAN), and/or a global area network (GAN), such as the Internet. It will also be understood that the network 410 is secure and may also include wireless and/or wireline and/or optical interconnection technology.

FIG. 4 also illustrates a system 420, in accordance with an embodiment of the present invention. The system 420 may refer to the "apparatus" described herein. The system 420 may include any computerized apparatus that can be configured to perform any one or more of the functions of the system 420 described and/or contemplated herein. In accordance with some embodiments, for example, the system 420 may include a computer network, an engine, a platform, a server, a database system, a front end system, a back end system, a personal computer system, and/or the like. Therefore, the system 420 may be a server managed by the entity. The system 420 may be located at the facility associated with the entity or remotely from the facility associated with the entity. In some embodiments, such as the one illustrated in FIG. 4, the system 420 includes a communication interface 422, a processor 424, and a memory 426, which includes a system application 428 and a datastore 429 stored therein. As shown, the communication interface 422 is operatively and selectively connected to the processor 424, which is operatively and selectively connected to the memory 426.

It will be understood that the system application 428 may be configured to implement any one or more portions of the various user interfaces and/or process flow described herein. The system application 428 may interact with the user application 438. It will also be understood that, in some embodiments, the memory includes other applications. It will also be understood that, in some embodiments, the system application 428 is configured to communicate with the datastore 429, the user input system 430, or the like.

It will be further understood that, in some embodiments, the system application 428 includes computer-executable program code portions for instructing the processor 424 to perform any one or more of the functions of the system application 428 described and/or contemplated herein. In some embodiments, the system application 428 may include and/or use one or more network and/or system communication protocols.

In addition to the system application 428, the memory 426 also includes the datastore 429. As used herein, the datastore 429 may be one or more distinct and/or remote datastores. In some embodiments, the datastore 429 is not located within the system and is instead located remotely from the system. In some embodiments, the datastore 429 stores information or data described herein.

It will be understood that the datastore 429 may include any one or more storage devices, including, but not limited to, datastores, databases, and/or any of the other storage devices typically associated with a computer system. It will also be understood that the datastore 429 may store information in any known way, such as, for example, by using one or more computer codes and/or languages, alphanumeric character strings, data sets, figures, tables, charts, links, documents, and/or the like. Further, in some embodiments, the datastore 429 may include information associated with one or more applications, such as, for example, the system application 428. It will also be understood that, in some embodiments, the datastore 429 provides a substantially real-time representation of the information stored therein, so that, for example, when the processor 424 accesses the datastore 429, the information stored therein is current or substantially current.

It will be understood that the embodiment of the system environment illustrated in FIG. 4 is exemplary and that other embodiments may vary. As another example, in some embodiments, the system 420 includes more, less, or different components. As another example, in some embodiments, some or all of the portions of the system environment 400 may be combined into a single portion. Likewise, in some embodiments, some or all of the portions of the system 420 may be separated into two or more distinct portions.

In addition, the various portions of the system environment 400 may be maintained for and/or by the same or separate parties. It will also be understood that the system 420 may include and/or implement any embodiment of the present invention described and/or contemplated herein. For example, in some embodiments, the system 420 is configured to implement any one or more of the embodiments of the process flows described and/or contemplated herein in connection any process flow described herein. Additionally, the system 420 or the user input system 430 is configured to initiate presentation of any of the user interfaces described herein.

The user input system 430 may include any computerized apparatus that can be configured to perform any one or more of the functions of the user input system 430 described and/or contemplated herein. For example, the user 435 may use the user input system 430 to transmit and/or receive information or commands to and from the system 420. In some embodiments, for example, the user input system 430 may include a personal computer system (e.g. a non-mobile or non-portable computing system, or the like), a mobile computing device, a personal digital assistant, a mobile phone, a tablet computing device, a network device, a wearable computing device, a sensor, and/or the like. As illustrated in FIG. 4, in accordance with some embodiments of the present invention, the user input system 430 includes a communication interface 432, a processor 434, a memory 436 having a user application 438 stored therein, and a user interface 439. In such embodiments, the communication interface 432 is operatively and selectively connected to the processor 434, which is operatively and selectively connected to the user interface 439 and the memory 436. In some embodiments, the user 435 may use the user application 438 to execute processes described with respect to the process flow and interfaces described herein. Specifically, the user application 438 executes the process flows described in FIGS. 1 and 2.

Each communication interface described herein, including the communication interface 432, generally includes hardware, and, in some instances, software, that enables the user input system 430, to transport, send, receive, and/or otherwise communicate information to and/or from the communication interface of one or more other systems on the network 410. For example, the communication interface 432 of the user input system 430 may include a wireless transceiver, modem, server, electrical connection, and/or other electronic device that operatively connects the user input system 430 to another system such as the system 420. The wireless transceiver may include a radio circuit to enable wireless transmission and reception of information. Each processor described herein, including the processor 434, generally includes circuitry for implementing the audio, visual, and/or logic functions of the user input system 430. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 438 of the memory 436 of the user input system 430.

Each memory device described herein, including the memory 436 for storing the user application 438 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 4, the memory 436 includes the user application 438. In some embodiments, the user application 438 includes an interface for communicating with, navigating, controlling, configuring, and/or using the user input system 430. In some embodiments, the user application 438 includes computer-executable program code portions for instructing the processor 434 to perform one or more of the functions of the user application 438 described and/or contemplated herein. In some embodiments, the user application 438 may include and/or use one or more network and/or system communication protocols.

Also shown in FIG. 4 is the user interface 439. In some embodiments, the user interface 439 includes one or more output devices, such as a display and/or speaker, for presenting information to the user 435. In some embodiments, the user interface 439 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 435. In some embodiments, the user interface 439 includes the input and display devices of a mobile device, which are operable to receive and display information.

Also shown in FIG. 4 is a user 435 of the user input system 430. The user input system 430 may be any computing device. The user 435 may be a person who uses the user input system 430 to execute a user application 438. The user application 438 may be an application to communicate with the system 420, perform a transaction, input information onto a user interface presented on the user input system 430, receive and/or transmit information, the like. The user application 438 and/or the system application 428 may incorporate one or more parts of any process flow described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for determining differences between two sets of customer data, the system comprising:
    at least one memory;
    at least one processor; and
    at least one module stored in memory, executable by the at least one processor, and configured to:
    receive a request according to a request process to perform a comparison;
    initiate presentation of a user interface to a first user;
    prompt the first user to input one or more pieces of information in the user interface, the one or more pieces of information comprising a first set of customer data and a second set of customer data and one or more limits on the numbers of pieces of customer data to be compared;
    generate a first comparison script for executing a comparison, wherein the comparison script comprises at least one password encryption process;
    place the first comparison script in a queue for execution, wherein the queue comprises one or more additional comparison scripts;
    determine that the one or more additional comparison scripts have been executed, thereby leaving the first comparison script next in the queue;
    receive the first set of customer data from a first database;
    convert the first set of customer data from a first format into a final format;
    store the formatted first set of customer data in a first file;
    receive the second set of customer data from a second database;
    convert the second set of customer data from a second format into the final format;
    store the formatted second set of customer data in a second file;
    retrieve the first file and the second file;
    execute the comparison according to the first comparison script, wherein the comparison comprises comparing the formatted first set of customer data in the first file and the formatted second set of customer data in the second file to determine one or more differences between the first set of customer data and the second set of customer data; and
    generate a third file comprising the one or more determined differences between the first set of customer data in the first file and the second set of customer data in the second file.

2. The system of claim 1, wherein the final format of each of the first and second sets of customer data comprises a single column comprising one or more rows of customer data.

3. The system of claim 2, wherein the final format of each of the first and second sets of customer data comprises at least one of a text file or a spreadsheet.

4. The system of claim 2, wherein comparing the formatted first set of customer data in the first file and the formatted second set of customer data in the second file comprises a row-by-row comparison of the formatted first set of customer data in the first file and the formatted second set of customer data in the second file.

5. The system of claim 1, wherein the module is further configured to generate a report identifying at least one of the one or more determined differences between the first set of customer data in the first file and the second set of customer data in the second file.

6. The system of claim 5, wherein the report comprises at least one of a test identification (ID), a table name, a file name, a column list, a table count, a total number of determined differences between the first set of customer data in the first file and the second set of customer data in the second file, a summary of ten determined differences between the first set of customer data in the first file and the second set of customer data in the second file, or a hyperlink reference to the third file.

7. The system of claim 1, wherein receiving the request from the user comprises receiving from a user one or more parameters for comparing the first and second sets of customer data, wherein the one or more parameters comprise at least one of ranges of customer data in the first and second sets of customer data to be included in the comparison, a maximum number of customer data entries to be compared in each of the first and second sets of customer data, a first table name and file, a second table name and file, one or more storage locations, or a destination email address.

8. The system of claim 1, wherein the first database and the second database are in different geographic locations.

9. A method for determining differences between two sets of customer data, the method comprising:
    receiving, by a computing device processor, a request according to a request process to perform a comparison;
    initiating, by a computing device processor, presentation of a user interface to a first user;
    prompting, by a computing device processor, the first user to input one or more pieces of information in the user interface, the one or more pieces of information comprising a first set of customer data and a second set of customer data and one or more limits on the numbers of pieces of customer data to be compared;

generating, by a computing device processor, a first comparison script for executing a comparison, wherein the comparison script comprises at least one password encryption process;

placing, by a computing device processor, the first comparison script in a queue for execution, wherein the queue comprises one or more additional comparison scripts;

determining, by a computing device processor, that the one or more additional comparison scripts have been executing, thereby leaving the first comparison next in the queue;

receiving, by a computing device processor, the first set of customer data from a first database;

converting, by a computing device processor, the first set of customer data from a first format into a final format;

storing, by a computing device processor, the formatted first set of customer data in a first file;

receiving, by a computing device processor, the second set of customer data from a second database;

converting, by a computing device processor, the second set of customer data from a second format into the final format;

storing, by a computing device processor, the formatted second set of customer data in a second file;

retrieving, by a computing device processor, the first file and the second file;

executing, by a computing device processor, the comparison according to the first comparison script, wherein executing the comparison script comprises comparing the formatted first set of customer data in the first file and the formatted second set of customer data in the second file to determine one or more differences between the first set of customer data and the second set of customer data; and generating, by a computing device processor, a third file comprising the one or more determined differences between the first set of customer data in the first file and the second set of customer data in the second file.

10. The method of claim 9, wherein the final format of each of the first and second sets of customer data comprises a single column comprising one or more rows of customer data.

11. The method of claim 10, wherein the final format of each of the first and second sets of customer data comprises at least one of a text file or a spreadsheet.

12. The method of claim 10, wherein comparing the formatted first set of customer data in the first file and the formatted second set of customer data in the second file comprises a row-by-row comparison of the formatted first set of customer data in the first file and the formatted second set of customer data in the second file.

13. The method of claim 9, further comprising generating a report identifying at least one of the one or more determined differences between the first set of customer data in the first file and the second set of customer data in the second file.

14. A computer program product for determining differences between two sets of customer data, the computer program product comprising a non-transitory computer-readable medium comprising code causing an apparatus to:

receive a request according to a request process to perform a comparison;

initiate presentation of a user interface to a first user;

prompt the first user to input one or more pieces information in the user interface, the one or more pieces of information comprising a first set of customer data and a second set of customer data and one or more limits on the numbers of pieces of customer data to be compared;

generate a first comparison script for executing a comparison, wherein the comparison script comprises at least one password encryption process;

place the first comparison script in a queue for execution, wherein the queue comprises one or more additional comparison scripts;

determine that the one or more additional comparison scripts have been executed, thereby leaving the first comparison script next in the queue;

receive a first set of customer data from a first database;

convert the first set of customer data from a first format into a final format;

store the formatted first set of customer data in a first file;

receive a second set of customer data from a second database;

convert the second set of customer data from a second format into the final format;

store the formatted second set of customer data in a second file;

retrieve the first file and the second file;

execute the comparison according to the first comparison script, wherein the comparison comprises comparing the formatted first set of customer data in the first file and the formatted second set of customer data in the second file to determine one or more differences between the first set of customer data and the second set of customer data; and generate a third file comprising the one or more determined differences between the first set of customer data in the first file and the second set of customer data in the second file.

15. The computer program product of claim 14, wherein the final format of each of the first and second sets of customer data comprises a single column comprising one or more rows of customer data.

16. The computer program product of claim 15, wherein the final format of each of the first and second sets of customer data comprises at least one of a text file or a spreadsheet.

17. The computer program product of claim 15, wherein comparing the formatted first set of customer data in the first file and the formatted second set of customer data in the second file comprises a row-by-row comparison of the formatted first set of customer data in the first file and the formatted second set of customer data in the second file.

18. The computer program product of claim 14, wherein the non-transitory computer-readable medium comprises code further causing the apparatus to generate a report identifying at least one of the one or more determined differences between the first set of customer data in the first file and the second set of customer data in the second file.

* * * * *